UNITED STATES PATENT OFFICE.

JULIAN S. GRAVELY, OF NEW HAVEN, CONNECTICUT, ASSIGNOR TO WINCHESTER REPEATING ARMS CO., OF NEW HAVEN, CONNECTICUT, A CORPORATION.

PROCESS OF PURIFYING MANGANESE DIOXIDS.

1,323,690.  Specification of Letters Patent.  Patented Dec. 2, 1919.

No Drawing.  Application filed June 14, 1919.  Serial No. 304,345.

*To all whom it may concern:*

Be it known that I, JULIAN S. GRAVELY, a citizen of the United States, residing at New Haven, in the county of New Haven and State of Connecticut, have invented a new and useful Improvement in Processes of Purifying Manganese Dioxids; and I do hereby declare the following to be a full, clear, and exact description of the same.

My invention relates to an improved process of purifying manganese dioxids with particular reference to the various by-product manganese dioxids commercially known as recovered manganese, and often containing lower oxids of manganese, the object being to remove the water-soluble content of such manganese dioxids, and to increase the amount of available oxygen present in them, thereby rendering them suitable for use as a depolarizer in dry batteries. A further object is to provide a cheap and efficient process for the purpose indicated to make it possible to utilize grades of manganese dioxid hitherto regarded as unavailable for use in the manufacture of dry batteries.

With these ends in view, my invention consists in a process of treating manganese dioxid, characterized by the use of a peroxid solution, whereby the water-soluble impurities of the manganese dioxid are removed and the content of available manganese dioxid increased.

In carrying out my improved process as I now prefer to practice it, the impure manganese dioxid, whatever its specific chemical character and however obtained, is finely ground and subjected to the action of a peroxid solution in excess quantity, the manganese dioxid and the peroxid solution being thoroughly agitated, with the result that the water-soluble impurities of the manganese dioxid, whatever they are, depending upon its character and derivation, are removed. For this purpose, I prefer to employ hydrogen peroxid, though I do not limit myself to its use, as other peroxid solutions would answer my purpose. After this washing process, the peroxid solution is separated, as by filtration, taking with it the water-soluble impurities of the manganese dioxid, whatever they may be, dependent upon its character and derivation as explained above.

The remaining purified manganese dioxid is dried and is then ready for use, and will be found to have an increased content of manganese present as manganese dioxid due to the oxidation by the peroxid of the lower oxids of manganese present in the material treated. In this connection it may be stated that the efficiency of manganese dioxid for battery purposes is largely increased by increasing its content of available oxygen. For example, a sample containing 12.40% of manganese dioxid representing 2.26% available oxygen, after being thoroughly washed with hydrogen peroxid and dried, was found to contain 22.97% of manganese dioxid representing 4.20% of available oxygen, the increase being probably due to the oxidation of lower oxids of manganese present, an increase in the available oxygen of over 85%.

By my improved process I render available for use in the manufacture of dry-batteries, different varieties of commercial manganese dioxid, whereas, hitherto in the manufacture of dry-batteries, it has been necessary to use relatively pure and much more expensive grades of manganese dioxid or else to resort to questionable and costly processes of purification, questionable because incurring the risk of introducing impurities detrimental to the use of the product for dry-battery purposes.

I claim:—

1. The herein described process of treating impure manganese dioxid, containing lower oxids of manganese, with a solution of a peroxid, whereby the water-soluble impurities are removed and the content of manganese present as dioxid is increased.

2. The herein described process of treating impure manganese dioxid containing lower oxids of manganese, with a solution of hydrogen peroxid, whereby the water-soluble impurities are removed and the content of manganese present as dioxid is increased.

In testimony whereof, I have signed this specification in the presence of two subscribing witnesses.

JULIAN S. GRAVELY.

Witnesses:
 DANIEL H. VEADER,
 ERIK S. PALMER.